US009241323B2

(12) United States Patent
Liu et al.

(10) Patent No.: US 9,241,323 B2
(45) Date of Patent: Jan. 19, 2016

(54) METHOD AND APPARATUS FOR TRANSPORT FORMAT SELECTION IN WIRELESS COMMUNICATION SYSTEM

(75) Inventors: Jinhua Liu, Beijing (CN); Qingyu Miao, Beijing (CN)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 127 days.

(21) Appl. No.: 13/806,436

(22) PCT Filed: Aug. 19, 2010

(86) PCT No.: PCT/CN2010/001255
§ 371 (c)(1),
(2), (4) Date: Dec. 21, 2012

(87) PCT Pub. No.: WO2012/022010
PCT Pub. Date: Feb. 23, 2012

(65) Prior Publication Data
US 2013/0136090 A1    May 30, 2013

(51) Int. Cl.
*H04W 72/02* (2009.01)
*H04L 1/00* (2006.01)
(Continued)

(52) U.S. Cl.
CPC ............. *H04W 72/02* (2013.01); *H04L 1/0002* (2013.01); *H04L 1/0006* (2013.01); *H04L 1/06* (2013.01)

(58) Field of Classification Search
CPC ............. H04W 28/0236; H04W 72/02; H04B 7/0619–7/0634; H04L 1/0002; H04L 1/0003; H04L 1/0006; H04L 1/0014; H04L 47/26; H04L 47/30; H04L 47/50–47/6295
USPC ............ 370/329; 455/63.4, 101, 115.1, 115.3
See application file for complete search history.

(56) References Cited

U.S. PATENT DOCUMENTS

2004/0184398 A1    9/2004   Walton et al.
2005/0053032 A1    3/2005   Itoh
(Continued)

FOREIGN PATENT DOCUMENTS

CN          1781275 A      5/2006
CN        101227255 A      7/2008
(Continued)

OTHER PUBLICATIONS

3GPP, "3rd Generation Partnership Project; Technical Specification Group Radio Access Network; Multiple Input Multiple Output in UTRA; (Release 7)", 3GPP TR 25.876 V7.0.0, Mar. 2007, 1-73.
(Continued)

*Primary Examiner* — Un C Cho
*Assistant Examiner* — Peian Lou
(74) *Attorney, Agent, or Firm* — Patent Portfolio Builders, PLLC

(57) ABSTRACT

The present invention relates to a method, apparatus for selecting transport formats in a wireless transmitting device and wireless communication device associated therewith, wherein the wireless transmitting device supports transmission modes including single-stream transmission mode and multiple-stream transmission mode and comprises a transmit buffer to buffer data before transport format being selected for transmitting said data to a wireless receiving device, comprising: acquiring radio qualities associated with each stream being transmitted to the wireless receiving device; setting the transmission mode according to received radio qualities; detecting whether there is buffer limitation for said transmit buffer when multiple-stream transmission mode is set; and when buffer limitation is detected and multiple-stream transmission mode is selected for stream transmission, allocating the buffered data among the multiple streams based on the received radio qualities associated with respective streams and selecting transport formats for respective streams of the multiple streams based on their respective allocated buffered data quantities. This enables to obviate the TX power imbalance in case of multiple-stream transmissions, balance code and power usage among UEs in a cell, and thus improve code multiplexing efficiency.

16 Claims, 3 Drawing Sheets

(51) Int. Cl.
  *H04L 1/06*      (2006.01)
  *H04L 12/835*    (2013.01)
  *H04B 7/06*      (2006.01)
  *H04W 72/06*     (2009.01)
  *H04W 72/14*     (2009.01)

(56) References Cited

U.S. PATENT DOCUMENTS

2006/0050723 A1* 3/2006 Yu ................................. 370/412
2006/0255989 A1* 11/2006 Kim et al. .................... 341/120
2010/0015988 A1* 1/2010 Goransson et al. ........ 455/452.2
2011/0243100 A1* 10/2011 Ball et al. ..................... 370/335

FOREIGN PATENT DOCUMENTS

| EP | 1513356 A2 | 3/2006 |
| EP | 1895680 A2 | 3/2008 |
| EP | 2106057 A1 | 9/2009 |
| WO | 2007075139 A2 | 7/2007 |
| WO | 2007092245 A2 | 8/2007 |

OTHER PUBLICATIONS

3GPP, "3rd Generation Partnership Project; Technical Specification Group Radio Access Network; Physical layer procedures (FDD) (Release 6)", 3GPP TS 25.214 V6.11.0, Dec. 2006, 1-59.

* cited by examiner

METHOD AND APPARATUS FOR TRANSPORT FORMAT SELECTION IN WIRELESS COMMUNICATION SYSTEM

TECHNICAL FIELD

The present invention relates generally to the field of wireless communication, and particularly to a method and apparatus for transport format (TF) selection in a wireless communication system.

BACKGROUND

Wireless communication systems are well known in the art. In previous wireless communication systems, radio interface is usually a bottleneck due to its limited transmitting capacity, and researches mainly focus on the impact from radio layer. But this is not necessarily true in advanced wireless communication systems, e.g. the third generation (3G) wireless communication systems, such as WCDMA, TD-SCDMA, CDMA2000 and their evolutions, because these wireless communication systems could provide large bandwidth even in radio interface layer. In the Third Generation Partnership Project (3GPP) High Speed Packet Access (HSPA) scope, a 2 by 2 Multiple Input Multiple Output (MIMO) is introduced in Rel-7, which means that there are two transmitting antennas in Node B side and two receiving antennas in User Equipment (UE) side. With 2 by 2 MIMO, up to two streams can be transmitted in parallel, and then the radio interface is able to provide even larger bandwidth and no longer a bottleneck in wireless communication.

With the rapid development of air interface technology, instead of radio interface, bandwidth of upper layers and/or application server gradually becomes the bottleneck in wireless communication. The bottleneck caused by upper layers may be, for example:

The bandwidth limit of backbone trunk;
The bandwidth limit of Iub tunnel;
The window stalling of Transport Control Protocol (TCP)/Radio Link Control (RLC); and
The bandwidth limit of application server.

In upper layers, there are already scheduling and congestion mechanisms about the bandwidth. For instance, in the backbone network, the field of Differentiated Services Code Point (DSCP) in Internet Protocol (IP) header is used to indicate the service priority to use the shared bandwidth, and in Iub interface, the flow control functionality is used to schedule the bandwidth and handle the congestion. This means the performance of upper layers plays a more and more important role in wireless communication systems and the interface between MAC and physical layer should consider the performance of upper layers.

Medium Access Control (MAC) layer is responsible for mapping logical channels to transport channels and selecting appropriate Transport Format for each transport channel. Data from upper layers is preferably buffered in a transmit buffer in MAC layer before TFs are selected for transport channels. A bottleneck in upper layers may render upper layers unable to supply sufficient data to the transmit buffer and will lead to a buffer limitation case.

Buffer limitation as used herein after refers to a situation in multiple-stream transmission where data quantity buffered in the transmit buffer is lower than the transport capacity of the multiple-streams.

Given a 2×2 MIMO transmission scheme in compliance with 3GPP specification as an example, when in dual-stream transmission case, TFs may be selected for streams, and same High Speed-Physical Downlink Shared Channel (HS-PDSCH) codes may be forced to use for both streams. During TF selection, a TF may firstly be selected for the first stream by taking total data bits buffered in a transmit buffer into account, and a maximum capable TF, which is the TF with the maximum transport block size with which the first stream can transmit, may be selected for the first stream. When selecting TF for the second stream, the buffered data bits to be considered may be rest data bits, i.e. the remaining data bits when subtracting the data bits to be transmitted by the first stream from the total buffered data bits. This scheme works well if there is no bottleneck in the upper layers, i.e. there are sufficient data bits buffered in the transmit buffer and the selected TFs best match the transmitting capacities of the two streams.

However, in case of buffer limitation, that is, if the bandwidth of upper layer becomes a bottleneck, it is possible that the data bits to be transmitted by the second stream will be much lower than its transmitting capacity. This becomes a problem.

When the TF selection is performed sequentially for two streams, the first stream may be allocated too many data bits to transmit as its TF is selected by taking total buffered data bits into account, and few data bits are left for transmitting by the second stream. This will lead to performance loss at least in following aspects:

1. Waste of HS-PDSCH Codes

A TF with large TB size is selected for the first stream. Since the number of HS-PDSCH codes to be used is determined by the TF, a large number of HS-PDSCH codes is needed to transmit such a large transport block, and the second stream will have to use same HS-PDSCH codes with small TB size, which means that there will be less HS-PDSCH codes left for other HS-DPA (High Speed-Downlink Packet Access) UEs to be scheduled in same cell. This causes a waste of HS-PDSCH code resource.

2. Larger Power/CQI Back-Off

The first stream uses much higher transmit power than the second stream statistically, which makes the interference from the first stream to the second stream much higher than the interference from the second stream to the first stream. In order to conquer such an inter-stream interference imbalance to reach a predetermined Block Error Ratio (BLER) target, the CQI adjustment needs larger back-off, which means a larger power backoff and a lower power utilization efficiency.

3. Transmit (TX) Power Imbalance Between Antennas

When utilizing a common pre-coder, the power imbalance between streams can result in the power imbalance between two TX antennas when two of the four Dual-stream Transmit Antenna Array (D-TxAA) pre-coders are used.

Another minor performance loss is due to the protocol/padding overhead when dual stream transmission is used in case there are too little buffered data bits to be transmitted.

SUMMARY

An object of the present invention is to provide an improved method and apparatus for selecting transport format for streams, which obviates at least some of the above-mentioned disadvantages.

According to a first aspect of the present invention, it provides a method for selecting transport formats in a wireless transmitting device which has transmission modes including single-stream transmission mode and multiple-stream transmission mode, the wireless transmitting device comprising a transmit buffer to buffer data before transport format being selected for transmitting said data to a wireless receiving device, the method comprising: acquiring radio qualities associated with each stream being transmitted to the receiving device; setting the transmission mode according to received radio qualities; and said method further comprising steps of: detecting for said transmit buffer whether there is buffer limitation when multiple-stream transmission mode is set, and when buffer limitation is detected and multiple-stream transmission mode is selected for stream transmission, allocating buffered data quantity among streams based on the received radio qualities associated with respective streams and selecting transport formats for streams based on their respective allocated data quantities.

Since a buffer situation is considered during TF selection, the buffered data bits are taken into account in a more reasonable way in buffer limitation case, which obviates the TX power imbalance in case of multiple-stream transmissions, balances code and power usage among UEs in a cell, and thus improves code multiplexing efficiency.

According to a second aspect of the present invention, the buffered data quantity is represented by the number of bits buffered in the transmit buffer, and said detecting step comprises: selecting preliminary transport formats for streams in multiple-stream transmission mode given no buffer limitation and obtaining transport block sizes indicated in the preliminary transport formats; comparing a sum of all transport block sizes for the multiple streams with the number of buffered bits; and determining that buffer limitation is detected if the sum exceeds the number of buffered bits.

According to a third aspect of the present invention, if buffer limitation is detected, selecting a single preliminary transport format for a single stream in single-stream transmission mode given no buffer limitation and obtaining a transport block size indicated in the single preliminary transport format; and if the transport block size is larger than or equal to the number of buffered bits, selecting single-stream transmission mode for stream transmission and using said single preliminary transport format as selected transport format for the single stream, otherwise selecting multiple-stream transmission mode for stream transmission.

By selecting single-stream transmission mode in case of too few buffered data quantity, overhead due to padding/header is reduced.

According to a fourth aspect of the present invention, if buffer limitation is detected and a single preliminary transport format for single-stream transmission mode is selected given no buffer limitation, even when the transport block size indicated in the single preliminary transport format is larger than or equal to the number of buffered bits, whether to select single-stream transmission mode for stream transmission is further determined by radio resources in the cell that the wireless transmitting device belongs to, i.e. the cell in which the wireless transmitting device is operating, said determining comprising: receiving information on power and code resources available in the cell, determining power and code resources required by said single preliminary transport format, and if the power and code resources left after subtracting the required power and code resources from said available power and code resources are above respective predetermined levels, selecting single-stream transmission mode for stream transmission, otherwise selecting multiple-stream transmission mode for stream transmission.

By selecting single-stream transmission mode in case of sufficient radio resources, the present invention ensures that other UEs in same cell may also use the radio resources for transmission in a relatively fair and efficient way.

Preferably, said radio quality including maximum reachable Signal-Interference-Ratio, and in said allocating step, the quantity of the buffered data allocated to each of the multiple streams is in proportion to maximum reachable Signal-Interference-Ratio per stream.

Preferably, said wireless transmitting device is a Node B and said wireless receiving device is a user equipment communicating in a wireless communication system, preferably a 3G wireless communication system employing multiple-input multiple-output technology.

According to a fifth aspect of the present invention, it provides an apparatus for selecting transport formats in a wireless transmitting device which has transmission modes including single-stream transmission mode and multiple-stream transmission mode, the wireless transmitting device comprising a transmit buffer to buffer data before transport format being selected for transmitting said data to a wireless receiving device, the apparatus comprising: acquiring means for acquiring radio qualities associated with each stream being transmitted to the wireless receiving device, transmission mode setting means for setting the transmission mode according to received radio qualities; detection means for detecting whether there is buffer limitation for said transmit buffer when multiple-stream transmission mode is set; and transport format selector being configured to, when buffer limitation is detected and multiple-stream transmission mode is selected for stream transmission by said transmission mode setting means, allocate the buffered data quantity among the multiple streams based on the received radio quality associated with respective streams and select transport formats for respective streams of the multiple streams based on their respective allocated data quantities.

The present invent also provides corresponding wireless transmitting device and a computer program product for carrying out the above-described method.

BRIEF DESCRIPTION OF THE DRAWINGS

The foregoing and other objects, features, and advantages of the present invention will become more apparent from the following descriptions of preferred embodiments and accompany drawings.

DETAILED DESCRIPTION

In the following description, for purposes of explanation rather than limitation, specific details, such as the particular architecture, interfaces, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

Figure 1:
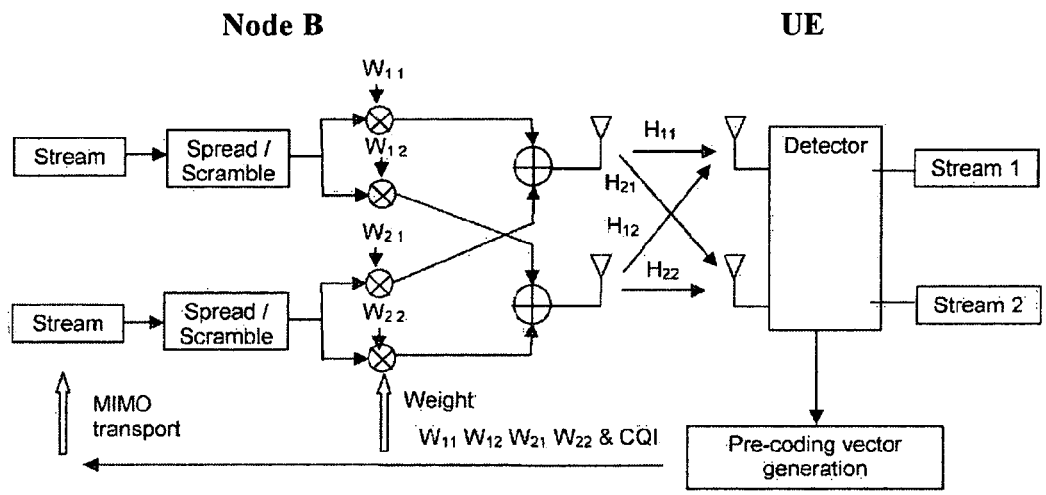
FIG. 1 illustrates an overview of a wireless communication system employing 2 by 2 MIMO.

In current 3GPP Rel-7, D-TxAA is adopted for the 2 by 2 MIMO transmission scheme. FIG. 1 shows an overview of a wireless communication system employing such a 2 by 2 MIMO transmission scheme. As shown in FIG. 1, UE estimates the downlink channel information (H11, H21, H12, H22), based on which UE selects preferred pre-coding vectors (W11, W21, W12, W22) and reports the pre-coding vectors to the Node B. UE also estimates the Signal to Interference plus Noise Ratio (SINR) of Common Control Pilot Channel (CPICH). The downlink channel quality, preferably indicated as Channel Quality Indicator (CQI), is estimated based on the received SINR of CPICH, and both the single-stream CQI and dual-stream CQIs are quantified by a specified quantization method. Using a High Speed Dedicated Physical Control Channel (HS-DPCCH), UE reports the pre-coding vector index and CQIs to Node B. Based on received CQIs, the Node B determines whether to transmit dual streams or single stream. When the downlink channel quality is good enough, two parallel streams are transmitted in order to reach higher downlink throughput and improve the user experience. Otherwise, if the downlink channel quality is poor, only single stream is transmitted.

Figure 2:
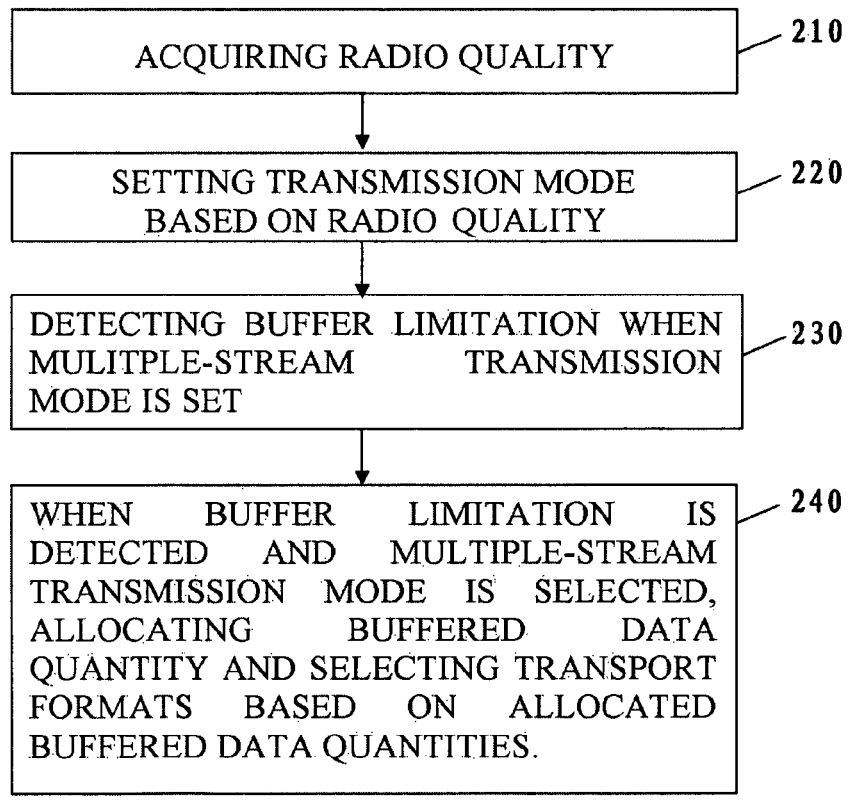
FIG. 2 illustrates a flow chart of a method for selecting TF according to the present invention.

FIG. 2 shows a flow chart of a method for selecting TF in a wireless transmitting device according to the present invention. The wireless transmitting device comprises a transmit buffer in e.g. MAC layer for buffering data before TFs are selected for transmitting data to a wireless receiving device. The wireless transmitting device supports different transmission modes including singlestream transmission mode and multiple-stream transmission mode. In multiple-stream transmission mode, multiple data streams can be used for communication between the wireless transmitting device and the wireless receiving device.

When data are buffered in transmit buffer and TFs are to be selected for transmitting said data, the wireless transmitting device firstly acquires radio qualities associated with both single-stream transmission and multiple-stream transmission in step 210. This may be performed by receiving both single-stream CQI and multiple-stream CQIs from the wireless receiving device and estimating the channel qualities for single-stream transmission mode and multiple-stream transmission mode. Preferably, the wireless transmitting device may obtain other information like radio sources, such as available HS-PDSCH power or HS-PDSCH codes in the cell that it belongs to.

A transmission mode will be set according to the received radio qualities in step 220. When the radio qualities are good enough, e.g. higher than predetermined thresholds, a multiple-stream transmission mode may be initially set, and detection as to whether there exists buffer limitation for the transmit buffer is performed in step 230. If the radio qualities are poor, a single-stream transmission mode will be selected and a TF may be selected for a single stream in a known way.

Detection of buffer limitation means that buffer situation of the transmit buffer is taken into account for TFs selection in multiple-stream transmission mode. The detection makes it possible to use different TF selection manner for buffer limitation case and no buffer limitation case, which enables an improved balance among multiple streams. According to an embodiment, when detecting buffer limitation, an infinite buffered data quantity in the transmit buffer may be assumed, and for each stream, a TF that best matches the transmitting capacity of the stream may be selected based on channel quality, available power and code resources, etc. The total data transmitting quantity indicated in the TFs is calculated and then compared with the buffered data quantity. A buffer limitation situation will be determined as detected when the buffered data quantity is lower than the total data transmitting quantity.

When buffer limitation is detected and multiple-stream transmission mode is selected for stream transmission, TF selection may be performed in a parallel way, that is, buffered data quantity may be allocated among streams according to radio qualities associated with respective streams, and transport format for one of the streams may be selected based on the data quantity allocated to the stream in step 240. For example, if there are N streams, a quantity of the buffered data may be allocated to nth stream based on the radio quality associated with the nth stream, n=1 . . . N, and a TF may be selected for the nth stream based on the data quantity allocated to it.

Preferably, when buffer limitation is detected, this generally means there is less data in the transmit buffer. In this case, transmission mode may be re-selected or re-set to ensure that in case the buffered data is too little, a single-stream transmission mode may be selected for stream transmission in order to reduce protocol or padding overhead due to multiple-stream transmission mode.

As such, the buffer situation is taken into account when selecting transport format for streams, or even when determining the transmission mode, i.e. whether to use single-stream or multiple-stream transmission, which reduces the large transmit power imbalance between MIMO streams and the waste of HS-PDSCH codes.

Figure 3:
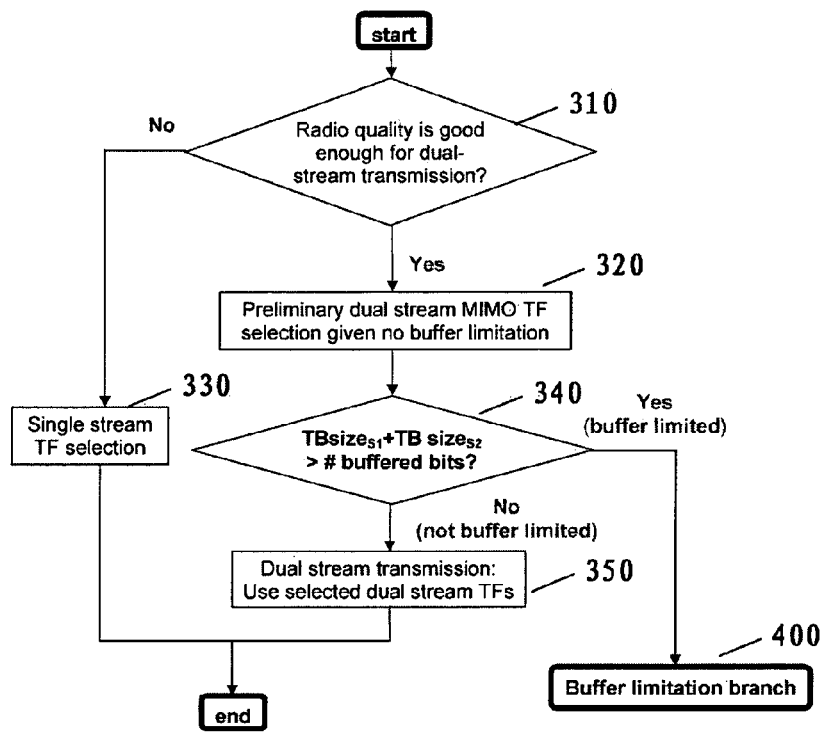
FIGS. 3 and 4 illustrate a flow chart of a method for selecting TF for HSPA 2 by 2 MIMO according to another embodiment of the present invention.
Figure 4:
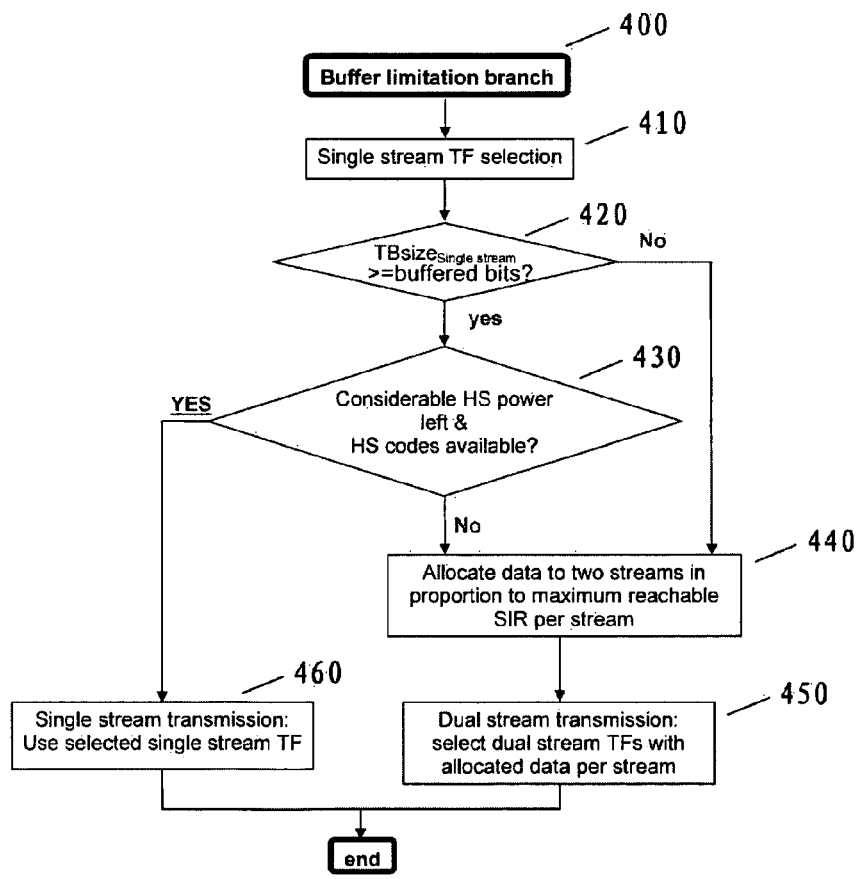

FIGS. 3 and 4 show a flow chart of MIMO transport format selection according to one embodiment of the present invention. The illustrated MIMO transport format selection is assumed to be carried out in a Node B of the wireless communication system shown in FIG. 1. The Node B has a transmit (TX) buffer, for example in its MAC layer, which buffers data to be transmitted to a UE.

Before TF selection, UE reports single-stream CQI and dual-stream CQIs to Node B. Node B may determine whether to use single-stream or dual-stream transmission based on radio qualities such as the maximum reachable SINRs associated with streams in step 310, which radio qualities may be estimated from the received CQIs and available HS-PDSCH power in the cell that the Node B belongs to, i.e. the cell served by the Node B in which the UE is operating.

If the radio quality is not good enough, single-stream transmission is selected for stream transmission in 330 and TF is selected for a single stream with respect to the buffered data bits. And then the MIMO TF selection flow comes to an end.

If the radio quality is good enough, dual-stream transmission is set and preliminary TFs for dual streams are selected based on data bits buffered in the TX buffer and, for example, available HS-PDSCH radio resources. Different from existing MIMO TF selection schemes, the preliminary TFs for dual-stream transmission are tentatively selected given no buffer limitation, i.e. assuming there is no buffer limitation in step 320, preferably assuming that the number of data bits buffered in the TX buffer are always larger than the total data transmitting quantity of the dual streams.

To determine for the transmit buffer whether there is buffer limitation, the TB sizes indicated in the selected preliminary TFs are summed and the sum is compared with the number of buffered data bits. If this sum does not exceed the number of buffered data bits, it is determined that there is no buffer limitation, and then preferably the preliminary TFs are used for the dual-stream transmission directly in step 350. The MIMO TF selection comes to an end.

If the sum is larger than the number of buffered data bits, it is determined that buffer limitation is detected and the preliminary TFs will not be used for the dual-stream transmission. In this case, both transmission mode and TFs may be reselected, as is illustrated in FIG. 4.

In some of buffer limitation cases, the transmit buffer may buffer little data. Then it may be advantage to determine which transmission mode will be more suitable when considering e.g. protocol or padding overhead. According to an embodiment, when buffer limitation is detected, transmission mode may be changed or reset to a single-stream transmission mode and a preliminary TF is tentatively selected for a single stream in step 410, probably given no buffer limitation. The TB size specified in the preliminary TF is compared with the number of buffered data bits in step 420 to determine if a single stream is sufficient to carry the buffered data bits. If the TB size is large enough, that is, if the TB size is larger than or equal to the number of buffered data bits, Node B selects single-stream transmission mode and uses the preliminary TF for single-stream transmission in step 460.

Alternatively, in addition to TB size, Node B may further check whether there are still considerable HS-PDSCH power and codes resources left/available for other UEs in the cell that the Node B belongs to if selecting such a TB size in step 430. This may be done through a decision as to whether the left power and codes resources are still above respective predetermined levels if subtracting the power and codes resources required for the preliminary TF from the total unused/available power and codes resources. If there are still considerable HS-PDSCH power and codes left for other UEs, single-stream transmission may be finally selected and the tentatively selected preliminary single-stream TF is used.

In this way, balance between code and power usage of MIMO UEs is achieved.

However, if it is determined in step 420 that the TB size is lower than the number of the buffered data bits, or if it is determined in step 430 that there are no enough HS-PDSCH power or codes left for other UEs, dual-stream transmission mode may be finally selected in order to save HS-PDSCH power or codes for other UEs. Upon selection of dual-stream transmission, the buffered data bits may be allocated to two streams in step 440 in such a way that the number of data bits allocated to a stream is in proportion to maximum reachable SIR of this stream. For both streams, TFs may be selected based on the allocated bits, available H-PDSCH radio resources and received CQI of the streams in step 450. Then the MIMO TF selection comes to an end.

As such, the TB sizes of streams are balanced when there are no enough buffered bits for transmitting so as to save HS-PDSCH codes for the rest HSDPA users, and the TX powers of two streams are balanced to reduce the inter-stream interference imbalance between streams and reduce the power imbalance between antennas when a common precoder is used.

Although the present invention is described here in a context of downlink MIMO transmission, as will be appreciated by one of skill in the art, the present invention is also applicable to uplink MIMO transmission. The wireless communication system may also be a more advanced wireless communication system, such as 3GPP Long Term Evolution (LTE) system.

Figure 5:
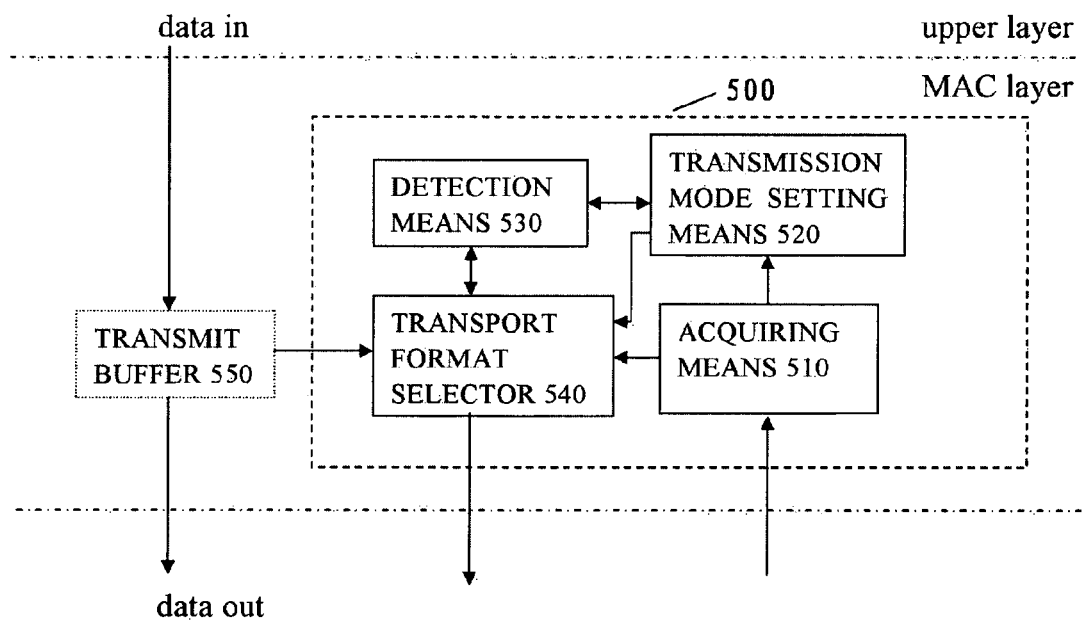
FIG. 5 illustrates a block diagram of an apparatus for selecting TF according to the present invention.

FIG. 5 illustrates a preferred embodiment of an apparatus 500 in a wireless transmitting device for selecting TF according to the present invention.

The wireless transmitting device comprises a transmit buffer 550 in e.g. MAC layer for buffering data from upper layer before selecting TFs for transmitting data to a wireless receiving device. The wireless transmitting device is arranged to support both single-stream transmission and dual-stream transmission. Preferably, the wireless transmitting device may adopt MIMO communications physical layer support. The wireless transmitting device and the wireless receiving device may be communicating in a 3G wireless communication system as exemplified in FIG. 1, and the wireless transmitting device may be a Node B and the wireless receiving device a UE or vice versa.

The apparatus 500 is configured to select TFs for the wireless transmitting device. The apparatus 500 comprises acquiring means 510, transmission mode setting means 520, detection means 530 and Transport format selector 540.

Acquiring means 510 is arranged to acquire radio quality associated with each stream to be transmitted to a wireless receiving device and notify acquired radio qualities to e.g. transmission mode setting means 520.

Upon notification of the radio qualities, transmission mode setting means 520 sets a transmission mode based on the radio qualities. When the radio qualities is good enough, transmission mode setting means 520 sets multiple-stream transmission mode and notify this to e.g. detection means 530.

Detection means 530 is triggered by the multiple-stream transmission mode setting notification to detect for the transmit buffer whether there exits buffer limitation and may notify its detection result to e.g transmission mode setting means 520.

In doing so, according to an embodiment of the present invention, detection means 530 may preferably instruct transport format selector 540 to select preliminary TFs for respective streams given no buffer limitation, obtain TB sizes indicated in the preliminary TFs, calculate a sum of all of the TB sizes, and compares the sum with the number of data bits buffered in the transmit buffer. Detection means 530 may determine that buffer limitation is detected if the sum exceeds the number of buffered data bits.

Once transmission mode setting means 520 gets the detection result, it may decide which transmission mode is to be selected, and then the transport format selector 540 may act accordingly.

If the detection result indicate that there is buffer limitation and transmission mode setting means 520 decides to select multiple-stream transmission mode, the transport format selector 540 may be instructed to reselect TF for each stream in such a buffer limitation case. Transport format selector 540 may then allocate the buffered data bits among streams based on radio qualities associated with respective streams and reselect TFs for respective streams based on their respective allocated data bits.

If the detection result indicates that there is no buffer limitation, transmission mode setting means 520 selects multiple-stream transmission mode and preferably instructs the transport format selector 540 to use the preliminary TFs for streams transmission.

According to an embodiment of the present invention, when buffer limitation is detected, the transport format selector 540 may be instructed to select a preliminary transport format for single-stream transmission mode given no buffer limitation. The transmission mode setting means 520 may decides to select single-stream transmission mode for stream transmission and the transport format selector 540 may use said preliminary transport format as selected transport format for the single stream if the TB size indicated in the preliminary TF is larger than or equal to the TB size indicated in the preliminary TF, otherwise the transmission mode setting means may decide to select multiple-stream transmission mode for stream transmission.

Preferably, selection of single-stream transmission mode is further dependent on radio resources available in the cell that the wireless transmitting device belongs to. According to an embodiment of the present invention, when the TB size indicated in the preliminary TF selected for the single stream is larger than or equal to the number of buffered data bits, information on total available radio resources are used to compare with radio resources required by the selected preliminary TF. Only if the differences between said total available power and code resources and the required power and code resources are above respective predetermined levels, single-stream transmission mode is selected. Otherwise, transmission mode setting means 520 may decide to select multiple-stream transmission mode and instruct the transport format selector 540 to reselect TFs.

As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. It should also be emphasized that the terms "comprises" and "comprising" when used in this specification is taken to specify the presence of stated features, integers, steps, components or groups but does not preclude the presence or addition of one or more other features, integers, steps, components or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for selecting transport formats in a wireless transmitting device that supports single-stream and multiple-stream transmission modes for transmitting to a wireless receiving device, said method comprising:
   acquiring radio qualities associated with the single-stream and multiple-stream transmission modes;
   setting a transmission mode of the wireless transmitting device at least initially to the single-stream transmission mode or the multiple-stream transmission mode based on the acquired radio qualities; and
   if the multiple-stream transmission mode is set:
      detecting whether there is a buffer limitation, wherein the buffer limitation is detected when a quantity of buffered data in a transmit buffer of the wireless transmitting device is lower than a transport stream capacity of the multiple streams to be used for transmitting the buffered data in the multiple-stream transmission mode;
      if the buffer limitation is detected and if the quantity of buffered data in the transmit buffer is less than a predetermined quantity of data, re-setting the transmission mode to the single-stream transmission mode;
      if the buffer limitation is detected and if the quantity of buffered data in the transmit buffer is more than the predetermined quantity of data, allocating the buffered data among the multiple streams, based on the acquired radio qualities associated with respective ones of the multiple streams and selecting transport formats for the respective ones of the multiple streams based on their respective allocated buffered data quantities.

2. The method of claim 1, wherein the quantity of buffered data is represented by a number of bits buffered in the transmit buffer, and wherein said detecting comprises:
   selecting preliminary transport formats for the multiple-stream transmission mode assuming that there is no buffer limitation and obtaining transport block sizes indicated in the preliminary transport formats;
   comparing the number of buffered bits with a sum of all transport block sizes indicated for the preliminary transport formats; and
   detecting that buffer limitation exists, based on detecting that the sum exceeds the number of buffered bits.

3. The method of claim 2, further comprising, if the transmission mode has been initially set to the multiple-stream transmission mode and buffer limitation is detected, selectively re-setting the transmission mode based on:
   selecting a single preliminary transport format for the single-stream transmission mode assuming that there is no buffer limitation and obtaining a transport block size indicated in the single preliminary transport format; and
   if the transport block size indicated in the single preliminary transport format is larger than or equal to the number of buffered bits, selecting the single-stream transmission mode for transmitting the buffered data, and otherwise selecting the multiple-stream transmission mode for transmitting the buffered data.

4. The method of claim 2, further comprising, if the transmission mode has been initially set to the multiple-stream transmission mode and buffer limitation is detected, selectively re-setting the transmission mode based on:
   selecting a single preliminary transport format for single-stream transmission mode assuming no buffer limitation and obtaining a transport block size indicated in the single preliminary transport format;
   acquiring information on total available radio resources in a cell that the wireless transmitting device belongs to; and
   selecting the single-stream transmission mode, if the transport block size is larger than or equal to the number of buffered bits and said total available radio resources are higher than predetermined levels as compared with radio resources required for the single-stream transmission mode, and otherwise selecting the multiple-stream transmission mode.

5. The method of claim 1, wherein said radio qualities include a maximum reachable Signal-Interference-Ratio, and further comprising determining the quantity of the buffered data allocated to the respective ones of the multiple streams in proportion to the maximum reachable Signal-Interference-Ratio per stream.

6. The method of claim 1, wherein said wireless transmitting device is a Node B in a wireless communication system and said wireless receiving device is a user equipment communicating in the wireless communication system.

7. The method of claim 6, wherein said wireless communication system is a wireless communication system employing multiple-input multiple-output technology.

8. An apparatus for selecting transport formats in a wireless transmitting device that supports single-stream and multiple-stream transmission modes for transmitting to a wireless receiving device, said apparatus comprising one or more processing circuits configured to:
acquire radio qualities associated with the single-stream and multiple-stream transmission modes;
set a transmission mode of the wireless transmitting device at least initially to the single-stream transmission mode or the multiple-stream transmission mode based on the acquired radio qualities; and
if the multiple-stream transmission mode is set:
detect whether there is a buffer limitation, wherein the buffer limitation is detected when a quantity of buffered data in a transmit buffer of the wireless transmitting device is lower than a transport stream capacity of the multiple streams to be used for transmitting the buffered data in the multiple-stream transmission mode;
if the buffer limitation is detected and if the quantity of buffered data in the transmit buffer is less than a predetermined quantity of data, re-setting the transmission mode to the single-stream transmission mode;
if the buffer limitation is detected and if the quantity of buffered data in the transmit buffer is more than the predetermined quantity of data, allocate the buffered data among the multiple streams, based on the acquired radio qualities associated with respective ones of the multiple streams and select transport formats for the respective ones of the multiple streams based on their respective allocated buffered data quantities.

9. The apparatus of claim 8, wherein the quantity of buffered data is represented by a number of bits buffered in the transmit buffer, and wherein the one or more processing circuits are configured to detect the buffer limitation based on:
selecting preliminary transport formats for the multiple-stream transmission mode assuming that there is no buffer limitation;
obtaining transport block sizes indicated in the preliminary transport formats; and
comparing the number of buffered bits with a sum of all transport block sizes indicated for the preliminary transport formats; and
detecting that buffer limitation exists, based on detecting that the sum exceeds the number of buffered bits.

10. The apparatus of claim 9, wherein, if the transmission mode has been initially set to the multiple stream transmission mode and buffer limitation is detected, the one or more processing circuits are configured to selectively reset the transmission mode based on:
selecting a single preliminary transport format for the single-stream transmission mode assuming that there is no buffer limitation and obtaining a transport block size indicated in the single preliminary transport format; and
if the transport block size indicated in the single preliminary transport format is larger than or equal to the number of buffered bits, selecting the single-stream transmission mode for transmitting the buffered data, and otherwise selecting the multiple-stream transmission mode for transmitting the buffered data.

11. The apparatus of claim 9, wherein, if the transmission mode has been initially set to the multiple stream transmission mode and buffer limitation is detected, the one or more processing circuits are configured to selectively reset the transmission mode based on:
selecting a single preliminary transport format for single-stream transmission mode assuming no buffer limitation and obtaining a transport block size indicated in the single preliminary transport format;
acquiring information on total available radio resources in a cell that the wireless transmitting device belongs to; and
selecting the single-stream transmission mode, if the transport block size is larger than or equal to the number of buffered bits and said total available radio resources are higher than predetermined levels as compared with radio resources required for the single-stream transmission mode, and otherwise selecting the multiple-stream transmission mode.

12. The apparatus of claim 8, wherein said radio qualities include a maximum reachable Signal-Interference-Ratio, and wherein the one or more processing circuits are configured to determine the quantity of the buffered data allocated to the respective ones of the multiple streams in proportion to the maximum reachable Signal-Interference-Ratio per stream.

13. The apparatus of claim 8, wherein said wireless transmitting device is a Node B configured for operation in a wireless communication system and said wireless receiving device is a user equipment communicating in the wireless communication system.

14. The apparatus of claim 13, wherein said wireless communication system is a wireless communication system employing multiple-input multiple-output technology.

15. The apparatus of claim 8, wherein the wireless transmitting device is a Node B in a Universal Mobile Telecommunications System, and wherein the apparatus comprises a part of the Node B.

16. The apparatus of claim 8, wherein the wireless transmitting device is an eNode B in a 3GPP Long Term Evolution LTE system, and wherein the apparatus comprises a part of the eNode B.

* * * * *